United States Patent Office 3,026,852
Patented Mar. 27, 1962

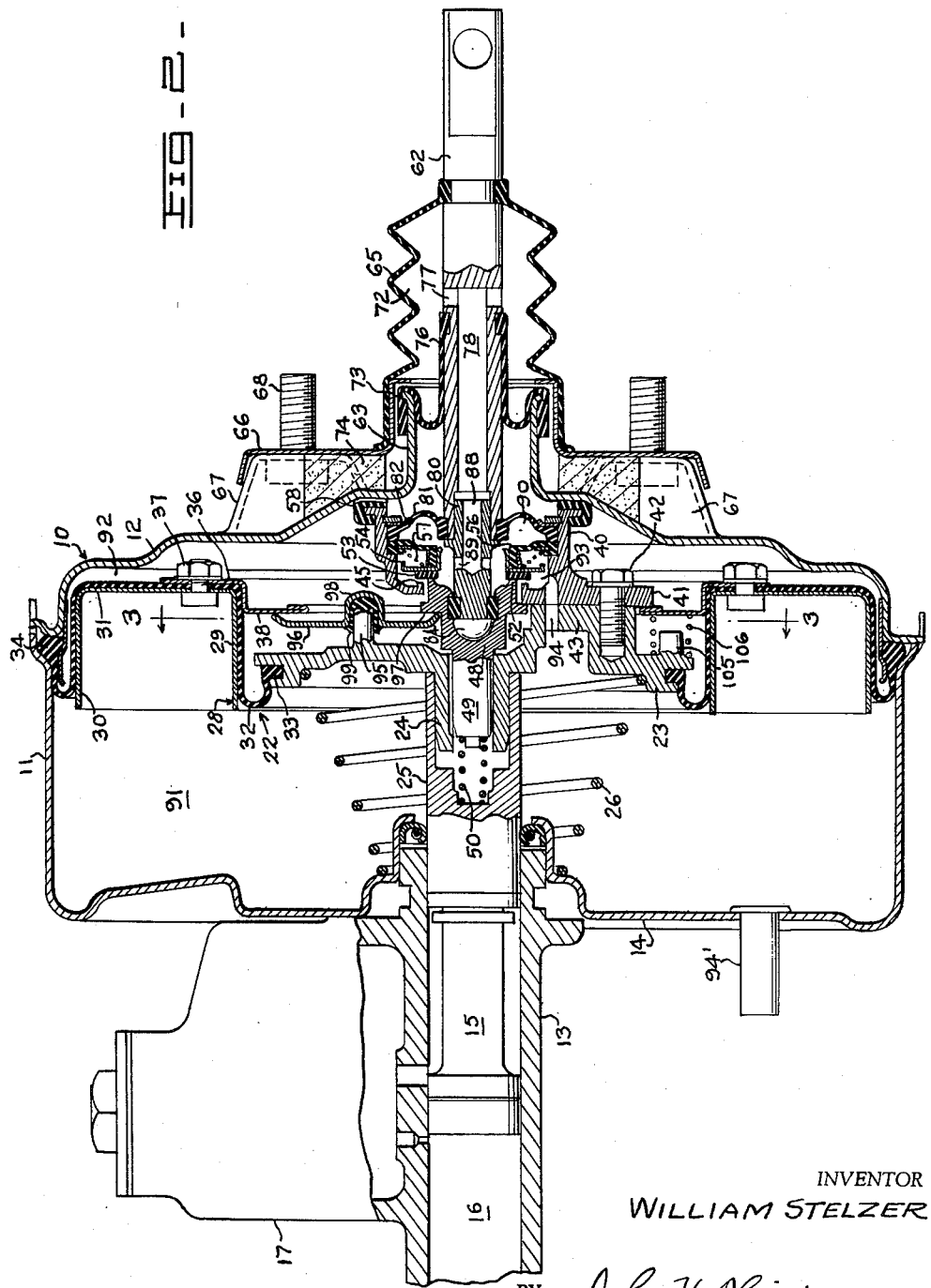

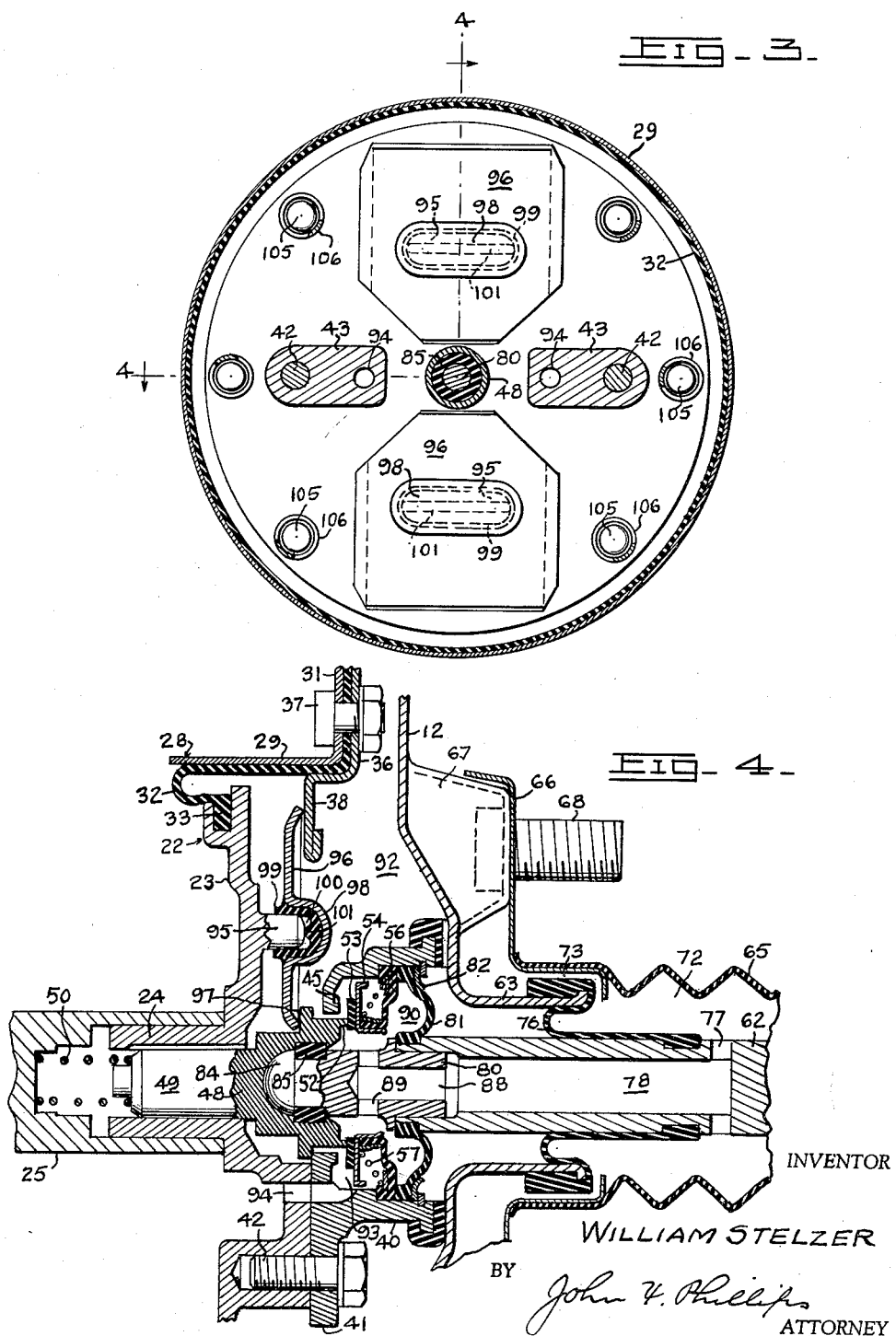

3,026,852
BOOSTER MOTOR MECHANISM
William Stelzer, Bloomfield Hills, Mich., assignor to Kelsey-Hayes Company, Detroit, Mich., a corporation of Delaware
Filed May 7, 1959, Ser. No. 811,571
10 Claims. (Cl. 121—41)

This invention relates to a booster motor mechanism.

There have been developed, in the past, fluid pressure motor mechanisms particularly intended for applying the brakes of motor vehicles wherein the pressure responsive units of the motors employ relatively movable parts which are utilized for transmitting reaction forces to the brake pedal through the operation of reaction levers carried by the pressure responsive units.

It also has been proposed in such mechanisms to use a type of valve mechanism wherein an annular valve element is normally engaged with the inner of two annular valve seats, which inner valve seat is connected to a push rod actuated by the brake pedal. Operation of the brake pedal moves the inner valve seat, which is followed by movement of the valve into engagement with the outer annular valve, whereupon further movement of the pedal operable push rod connects the motor to a source of pressure. This type of valve mechanism has been found highly efficient in operation but is subject to unbalanced pressures under various operating conditions.

An important object of the present invention is to provide a novel motor of the type referred to above, wherein the valve mechanism is pressure-balanced, thus smoothing out the operation of the brake pedal and the parts connected thereto and permitting the transmission to the brake pedal of accurate reaction.

A further object is to provide such a mechanism wherein the pedal operable push rod is connected to certain motor parts by diaphragms so arranged as to balance fluid pressures affecting the push rod to eliminate any false "feel" in the brake pedal.

A further object, more specifically, is to provide such a motor wherein one of the diaphragms is connected between the pedal operable push rod and the pressure responsive unit of the motor while the other is connected between the push rod and the motor casing and is of the rolling type so that it is effective in conjunction with the first-mentioned diaphragm throughout the range of operation of the brake pedal for balancing fluid pressures affecting the pedal operable push rod.

Other objects and advantages of the invention will become apparent during the course of the following description.

In the drawings I have shown one embodiment of the invention. In this showing:

FIGURE 2 is an enlarged axial sectional view through the motor and associated parts, parts being broken away and parts being shown in elevation;

FIGURE 3 is a section taken substantially on line 3—3 of FIGURE 2; and

FIGURE 4 is an enlarged fragmentary sectional view taken substantially on line 4—4 of FIGURE 3.

Figure 1:
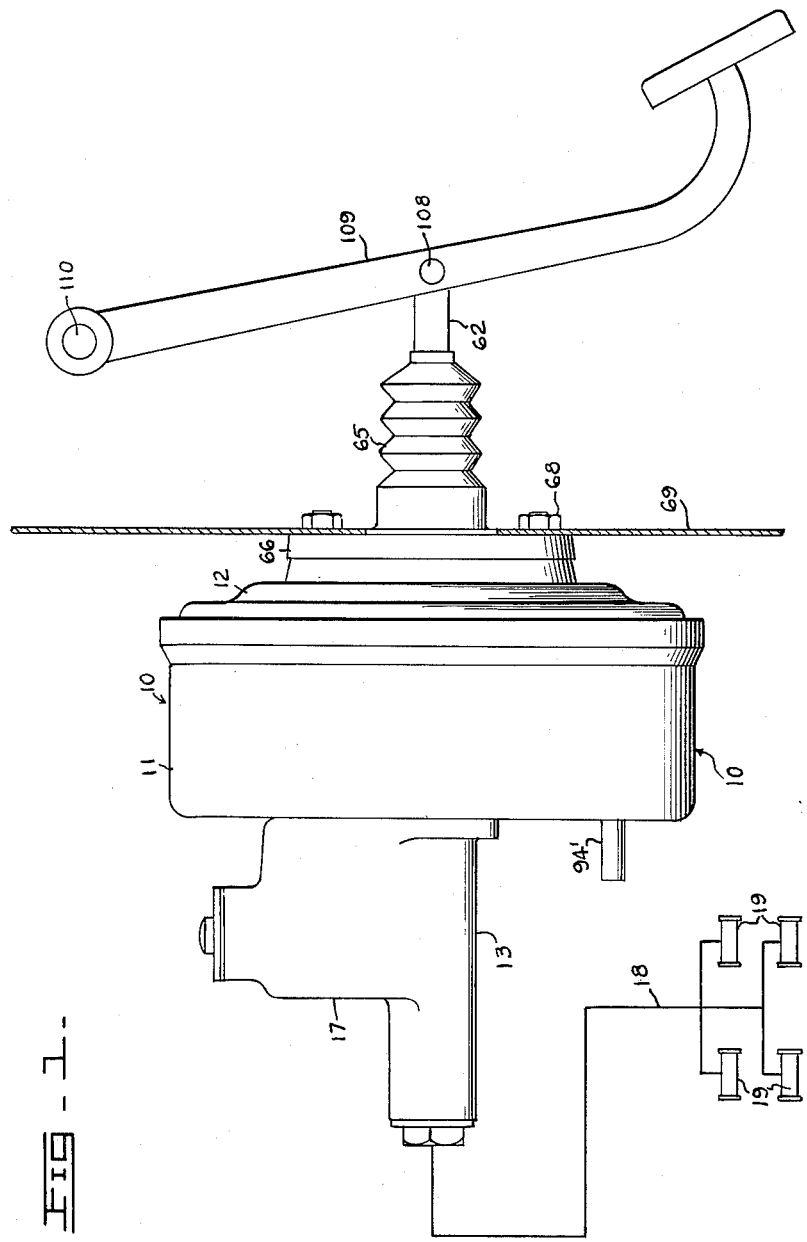
FIGURE 1 is a side elevation of the motor shown connected to a brake pedal, with the connections from the master cylinder to the wheel cylinders of a motor vehicle shown diagrammatically.

Referring to the drawings and particularly to FIGURE 2, the numeral 10 indicates the fluid pressure motor as a whole comprising a pair of casing sections 11 and 12. A conventional master cylinder 13 is secured in any suitable manner to the back wall 14 of the casing section 11 and is provided therein with a conventional plunger 15 for generating hydraulic pressure in the master cylinder chamber 16. The master cylinder is provided with the usual reservoir 17. Pressure displaced from the chamber 16 flows through lines 18 to the usual vehicle wheel cylinders 19.

The motor is provided therein with a pressure responsive unit indicated as a whole by the numeral 22. This unit comprises an inner preferably die-cast body 23 having a tubular forwardly extending axial portion 24 fitting into a rearward extension 25 on the master cylinder plunger 15. The axial extension 25 is integral with the plunger 15 and serves to support the pressure responsive unit of the motor. The body 23 is biased to its normal position by a conventional return spring 26.

The pressure responsive unit 22 further comprises an annular shell 28 having an inner flange 29, and an outer flange 30 and an end wall 31. Around such shell extends a diaphragm 32 of the rolling type, the inner extremity of which terminates in a bead 33 connected to the body 23. The periphery of the diaphragm 32 is provided with a bead 34 suitably clamped between the housing sections 10 and 11. The joint for connecting these housing sections may be of any desired type and forms no part of the present invention. An annular plate 36 is secured, as at 37, to the end wall 31 and is provided with a radially inwardly extending flange 38 for a purpose to be described. It will be apparent that the body 23 and shell 28 are connected together by an intervening portion of the diaphragm 32, hence the pressure responsive unit comprises radially inner and outer portions which are axially movable relative to each other.

The pressure responsive unit comprises a second cast body 40 having portions 41 seating against and secured by screws 42 to pads 43 (FIGURE 3) cast integral with the body 23. Except for the connection described between the bodies 23 and 40, these bodies are spaced from each other for a reason which will become apparent. The body 40 is provided with an annular valve seat 45 engageable by a valve to be described.

A valve body 48 is arranged between the two bodies 23 and 40 and is provided with a forwarding extending stem 49 freely slidable in the axial extension 24. The valve body 48 is biased rearwardly or to the right in FIGURE 2 by a spring 50. At its rear extremity, the body 48 is provided with a valve seat 52 normally engaging with a resilient annular valve element 53 which is normally disengaged from the seat 45. The valve element 53 is carried by a cage 54 supported with respect to the body 40 by a diaphragm 56. A spring 57 biases the valve 53 toward the seats 45 and 52. The body 40 is provided with a rubber or similar bumper 58 normally seating against the adjacent wall of the casing section 12, as shown in FIGURES 2 and 4.

A pedal operable push rod 62 extends into the right-hand end of the motor and is surrounded by an axial extension 63 formed on the casing section 12 and substantially annularly spaced from the rod 62 for a purpose to be described. A boot 65 is connected between the push rod 62 and a cover shell 66 fixed to stamped bosses 67 formed on the casing section 12 and adapted for connection by bolts 68 to the fire wall 69 (FIGURE 1) of the motor vehicle. The space within the boot 65 forms an air chamber 72 communicating through a space 73 with the atmosphere through an air cleaner 74 mounted between the cover shell 66 and casing section 12.

A rolling diaphragm 76 is connected at its outer edge to the axial casing extension 63 and at its inner edge to the push rod 62 inwardly of air ports 77 in the push rod 62, which ports communicate with an axial passage 78 in the push rod 62. It will be apparent that the parts are in the off positions shown in FIGURE 2 and that the push rod is movable to the left of such position with the diaphragm 76 rolling along the inner surface of the axial casing section 63.

A connecting member 80 has its right-hand end press-fitted or welded into the adjacent end of the push rod 62 and clamps in position with respect thereto the inner bead of a diaphragm 81. The outer bead of such diaphragm is fixed by suitable means 82 to the body 40. The inner end of the connecting member 80 has a ball-and-socket connection 84 with the valve body 48, and a rubber connecting member 85 is arranged as shown in FIGURE 4 to resiliently fix the connecting member 80 in position and to permit some rocking movement between the member 80 and valve body 48 if such rocking movement is necessary, as referred to below.

The connecting member 80 is provided with an axial passage 88 communicating through ports 89 with a chamber 90 formed within the diaphragms 81 and 56 and shell 54. It will be apparent that the chamber 90 is always in communication with the atmosphere.

The pressure responsive unit divides the motor to form chambers 91 and 92, the latter of which is the control or variable pressure chamber of the motor. In the normal positions of the parts, the chamber 92 communicates with a chamber 93 radially outwardly of the valve seat 45, and the chamber 93 communicates through passage 94 with the chamber 91. A suitable nipple or other connection 94' is adapted for connection with a conduit leading to a source of vacuum to maintain the chamber 91 evacuated.

The cast body 23 is provided, preferably at diametrically opposite points, with tangentially elongated fulcrum ribs 95 (FIGURES 3 and 4). For the purpose of illustration, the section shown in FIGURE 4 is taken on the line 4—4 of FIGURE 3 to show both a fulcrum rib 95 and a screw 42 and associated portions of the bodies 23 and 40. The section illustrated in FIGURE 2 is taken along similar planes for the same purpose. These fulcrum ribs pivotally support reaction levers 96, the outer ends of which are preferably turned rearwardly to engage the flange 38. The inner ends of these levers are turned rearwardly to engage against an annular shoulder 97 formed on the valve body 48.

Referring to FIGURES 3 and 4, each lever 96 is in the form of a plate and is provided with a stamped portion 98 forming a recess in which is molded a rubber body 99, the rear portion of which is shaped similar to and receives the adjacent fulcrum rib 95. The resilient body 99 is provided therein with a recess 100 which is spaced from the extremity of the adjacent rib 95, except that the center of the body 99 is provided with an elongated rib 101 engaging the rib 95. It will become apparent that the invention as claimed in the present application is operative with any other suitable type of reaction levers 96. These levers form per se no part of the present invention but are described and claimed in my copending application Serial No. 816,585, filed May 28, 1959.

At circumferentially spaced points, the body 23 is provided with rearwardly extending bosses 105. Coil springs 106 surround these bosses and engage at opposite ends against the body 23 and flange 38 to oppose movement of the latter toward the body 23 for a purpose to be described.

In the present instance, the rear end of the push rod 62 is shown as being pivotally connected as at 108 with a depending pedal lever 109. This lever is mounted on an upper fixed pivot 110 and, accordingly, the pivot 108 swings in an arc of a circle concentric with the axis of the pivot 110. The vertical component of movement of the pivot 108 is accommodated by the rocking and flexible connection between the member 80 and the valve 48. If desired, of course, the push rod 62 may move linearly and may be connected to the brake pedal by a suitable link.

Operation

As stated, the parts normally occupy the positions shown in FIGURES 2 and 4. The motor mechanism is operated by depressing the pedal 109 to effect movement to the left in FIGURES 2 and 4 of the push rod 62 and connecting member 80, thus moving the valve body 48 to the left. While the radially inner and outer ends of the levers 96 substantially contact, in the normal positions of the parts, with the shoulder 97 and flange 38 respectively, movement of the inner end of the lever 96 is effected with minimum resistance, the fulcrum rib 95 sliding into the recess 100 and readily deforming the highly resilient rib 101. Initial movement of the brake pedal, therefore, takes place principally against the light loading of the spring 50, thus providing a "soft" initial pedal.

The movement referred to continues with the valve element 53 following the valve seat 52 until the valve element contacts with the seat 45. At this point, the valve parts will be in lap position and the control chamber 92 will be disconnected from the chamber 93 with which it previously was in communication to effect the normal vacuum balancing of the pressure responsive unit in the off positions of the parts. Movement of the valve body 48 beyond the lap valve position moves the valve seat 52 away from the valve element 53, thus connecting the chamber 90 with the motor control chamber 92. The chamber 90 is always in communication with the atmosphere through passages 88 and 78, ports 77, chamber 72, space 73, and air cleaner 74.

Accordingly, air will flow into the control chamber 92 to effect movement of the pressure responsive unit 22 to the left in FIGURE 2. Movement of the body 23 of the pressure responsive unit transmits movement to the plunger 15 to displace fluid from the chamber 16 into the brake lines. Some resistance to such movement is encountered, of course, whereas the radially outer portion of the pressure responsive unit meets no resistance in its movement toward the left. However, the radially outer portion of the pressure responsive unit, namely, the shell 28 and diaphragm 32, do not tend to move to the left relative to the body 23 due to the action of the springs 106, acting as counter-reaction springs, to hold the flange 38 in engagement with the portions 41 of the body 40.

The radially inner and outer portions of the pressure responsive unit move the same distance until sufficient resistance to movement of the plunger 15 is encountered to overcome the loading of the springs 106. This occurs approximately at the point of initial contact of the brake shoes with the drums, whereupon the outer portion of the pressure responsive unit moves to the left relative to the body 23. The flange 38 thereupon tends to move the radially outer ends of the levers 96 to the left, causing the inner ends of such levers to exert a force against the shoulder 97 to oppose valve operating movement of the push rod 62. This action provides the pedal with highly desirable reaction, which will be proportional to the degree of brake application.

In prior constructions, various surfaces of the valve mechanisms and associated parts have been subjected to different pressures which affect the "feel" and reaction transmitted to the brake pedal. This is eliminated in the present construction by the use of the diaphragms 76 and 81. It will be noted that the diaphragm 76 has an effective area between the push rod 62 and casing extension 63 which is substantially less than the effective areas of the faces of the diaphragm 81. The outer or right-hand face of the diaphragm 76 is always open to atmospheric pressure, and the same is true of the outer end of the rod 62. Such area of the rod 62 and the effective area of the diaphragm 76 combine to equal the effective area of each of the faces of the diaphragm 81. The left-hand face of the diaphragm 81 is always open to atmospheric pressure in the chamber 90, and the total atmospheric pressure acting to the right against the diaphragm 81 is equal to the total atmospheric pressure acting to the left against the effective area of the diaphragm 76 plus the exposed end of the rod 62. These pressures always balance each other.

The pressure in the space between the diaphragms 76 and 81 varies according to pressure in the motor control chamber 92, there being leakage around the bumper 58 in the normal off positions of the parts, and such bumper being out of engagement with the casing wall 12 when the motor is energized. If desired the bumper 58 may be grooved for more positive communication of the control chamber 92 with the space between the diaphragms 76 and 81. In the off positions of the parts, full vacuum is present in this motor chamber and also in the space between the two diaphragms referred to, and when motor energization takes place, the space between the diaphragms is subject to increasing pressures in the chamber 92. The area of the right-hand face of the diaphragm 81 is substantially greater than the area of the left-hand face of the diaphragm 76. However, there is leakage around the stem 49, and the pressure at the left-hand end of such stem equals the pressure in the motor chamber 92. The area of the left-hand end of the stem 49 substantially cancels out the difference in the areas of the diaphragms 76 and 81, and accordingly there are balanced pressures affecting the adjacent faces of the diaphragms 76 and 81, taking into account the area of the left-hand end of the stem 49.

The various pressure surfaces just described are parts of movable structures which have surfaces exposed respectively to pressure in the motor chamber 92 to balance out each other, and surfaces exposed to the source of motor operating pressure, in this case the atmosphere, to balance out each other. Accordingly, the movable elements of the valve mechanism are substantially pressure-balanced so that there is no false "feel" or reaction transmitted to the brake pedal. Thus in operating the mechanism, the operator initially feels almost solely the resistance of the spring 50 minus the oppositely acting valve operating spring 57, and after the lap position of the valves has been passed, the operator feels only the resistance of the relatively light spring 50 until relative movement of the parts of the pressure responsive unit takes place to transmit reaction to the brake pedal through the levers 96. The operator therefore feels an accurate reaction to movement of his foot during actual brake application without having any false "feel" reaction transmitted to his foot because of the presence of fluid pressures acting on the pedal operable push rod. The mechanism thus provides for the highly efficient operation of the brake mechanism of a motor vehicle.

So far as the present invention is concerned, any suitable type of reaction lever mechanism may be employed, the pressure balancing diaphragms 76 and 81 functioning regardless of the specific type of reaction lever. These levers, as previously stated, form no part per se of the present invention but are described and claimed in my copending application Serial No. 816,585, filed May 28, 1959.

The releasing of the parts will be apparent. When the brake pedal is released, the valve return spring 50 will promptly return the valve element 53 to its normal position to re-connect the motor chamber 92 with the chamber 93, and air will be evacuated from the chamber 92 through the passage 94 and the constant vacuum chamber 91. The return spring 26 then returns the pressure responsive unit to its off position. Upon the releasing of pressures from the chamber 92, the counter-reaction springs 106 will return the radially outer portion of the pressure responsive unit to its normal position with the flange 38 engaging the portions 41 of the body 40.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A booster motor mechanism comprising a casing and a pressure responsive unit forming therewith a control chamber, and an axially movable structure comprising a follow-up valve mechanism normally connecting said control chamber to a source of relatively low pressure and movable to connect such chamber to a source of higher pressure, said movable structure having substantially equal areas facing in opposite directions exposed to said source of higher pressure and having substantially equal areas facing in opposite directions exposed to pressures in said control chamber whereby said movable structure is pressure-balanced.

2. A booster motor mechanism comprising a casing and a pressure responsive unit forming therewith a control chamber, and an axially movable structure comprising a follow-up valve mechanism normally connecting said control chamber to a source of relatively low pressure and movable to connect such chamber to a source of higher pressure, said movable structure comprising a manually operable rod, and a pair of flexible diaphragms one of which is connected between said rod and said casing and the other of which is connected between said rod and said pressure responsive unit, said movable structure having surfaces, including the remote faces of said diaphragms, of substantially equal areas facing in opposite directions exposed to said source of higher pressure, said movable structure having other surfaces of equal areas facing in opposite directions exposed to pressure in said control chamber whereby said movable structure is axially pressure-balanced.

3. A booster motor mechanism comprising a casing having a pressure responsive unit dividing it to form a constant pressure chamber connected to a source of relatively low pressure and a variable pressure chamber, and an axially movable structure comprising a follow-up valve mechanism normally connecting said chambers to each other and movable to disconnect said control chamber from said constant pressure chamber and connect said control chamber to a source of higher pressure, said axially movable structure having surfaces of substantially equal areas facing in opposite directions constantly exposed to pressure in said higher pressure source and having surfaces of substantially equal areas facing in opposite directions exposed to pressures in said control chamber whereby said axially movable structure is axially pressure-balanced.

4. A booster motor mechanism comprising a casing having a pressure responsive unit dividing it to form a constant pressure chamber connected to a source of relatively low pressure and a variable pressure chamber, and an axially movable structure comprising a follow-up valve mechanism normally connecting said chambers to each other and movable to disconnect said control chamber from said constant pressure chamber and connect said control chamber to a source of higher pressure, said axially movable structure comprising a manually operable rod and a pair of axially spaced flexible diaphragms connected at their inner peripheries to said push rod and connected at their radially outer peripheries respectively to said pressure responsive unit and said casing, said axially movable structure having surfaces, including the remote faces of said diaphragms, of substantially equal areas facing in opposite directions constantly exposed to pressure in said higher pressure source and having surfaces, including the adjacent faces of said diaphragms, of substantially equal areas facing in opposite directions open to said control chamber whereby said axially movable structure is pressure-balanced.

5. A booster motor mechanism comprising a casing, a pressure responsive unit therein dividing said casing to form a constant pressure chamber connected to a source of relatively low pressure and a control chamber, a force transmitting member connected to said pressure responsive unit and projecting axially therefrom in one direction, and an axially movable structure projecting from said pressure responsive unit axially in the other direction, said axially movable structure comprising a follow-up valve mechanism normally connecting said motor chambers to each other and movable to connect said control chamber to a source of higher pressure, said axially movable structure comprising a manually operable rod connected to said valve mechanism, said casing having an axial extension surrounding and of greater diameter than said rod, a pair of axially spaced diaphragms one of which is connected between said rod and said pressure responsive unit and the other of which is connected between said rod and said axial casing extension, said other diaphragm being of the rolling type whereby it rolls over the inner surface of said axial casing extension when said rod is moved to operate said valve mechanism, said axially movable structure having surfaces of substantially equal areas, including the remote faces of said diaphragms, facing in opposite directions, open to said source of higher pressure and having surfaces, including the adjacent faces of said diaphragms, of substantially equal areas facing in opposite directions exposed to pressure in said control chamber whereby said axially movable structure is pressure-balanced.

6. A mechanism according to claim 5 wherein said source of relatively low pressure is a source of vacuum and said source of higher pressure is the atmosphere, an annular flexible boot having one end surrounding said axial casing extension and its other end connected to said rod between said other diaphragm and the end of said rod, said boot forming with said rod and said other diaphragm an atmospheric chamber, and an air cleaner between said atmospheric chamber and the atmosphere, said surfaces exposed to said source of relatively higher pressure including said end of said rod and the face of said other diaphragm open to said atmospheric chamber.

7. A booster motor mechanism comprising a casing, a pressure responsive unit in said casing dividing it to form a constant pressure chamber and a control chamber, said pressure responsive unit comprising axially relatively movable radially inner and outer portions, a force transmitting member connected to said radially inner portion of said pressure responsive unit, an axially movable structure comprising a follow-up valve mechanism normally connecting said chambers to each other and movable to disconnect said control chamber from said constant pressure chamber and connect said control chamber to a source of higher pressure, said axially movable structure having surfaces of substantially equal areas facing in opposite directions exposed to said source of higher pressure and having surfaces of substantially equal areas facing in opposite directions exposed to pressure in said control chamber whereby said axially movable structure is axially pressure-balanced, and reaction means connected between the radially inner and outer portions of said pressure responsive unit and said axially movable structure to oppose valve operating movement of the latter when said pressure responsive unit tends to move relative to said radially inner portion incident to resistance to movement of said force transmitting member.

8. A motor mechanism according to claim 7 wherein said reaction means comprises levers fulcrumed on said radially inner portion of said pressure responsive unit and having opposite ends mechanically engaged with said axially movable structure and with the radially outer portion of said pressure responsive unit.

9. A booster motor mechanism comprising a casing, a pressure responsive unit in said casing dividing it to form a constant pressure chamber and a control chamber, said pressure responsive unit comprising axially relatively movable radially inner and outer portions, a force transmitting member connected to said radially inner portion of said pressure responsive unit, an axially movable structure comprising a follow-up valve mechanism normally connecting said chambers to each other and movable to disconnect said control chamber from said constant pressure chamber and connect said control chamber to a source of higher pressure, an axially movable manual rod, and a pair of axially spaced flexible diaphragms having their inner edges connected to said rod and their outer edges connected respectively to said pressure responsive unit and to said casing, said axially movable structure having surfaces, including the remote faces of said diaphragms, of substantially equal areas facing in opposite directions constantly exposed to pressure in said higher pressure source and having surfaces, including the adjacent faces of said diaphragms, of substantially equal areas facing in opposite directions exposed to said control chamber whereby said axially movable structure is pressure-balanced, and reaction means connected between the radially inner and outer portions of said pressure responsive unit and said axially movable structure to oppose valve operating movement of the latter when said pressure responsive unit tends to move relative to said radially inner portion incident to resistance to movement of said force transmitting member.

10. A motor mechanism according to claim 9 wherein said reaction means comprises a plurality of radial levers fulcrumed intermediate their ends on said radially inner portion of said pressure responsive unit and having their radially inner and outer ends mechanically engaged respectively with said rod and with the radially outer portion of said pressure responsive unit.

References Cited in the file of this patent

UNITED STATES PATENTS

| | | |
|---|---|---|
| 2,383,618 | Rockwell | Aug. 28, 1945 |
| 2,784,702 | Ayers | Mar. 12, 1957 |
| 2,826,041 | Rike | Mar. 11, 1958 |
| 2,832,316 | Ingres | Apr. 29, 1958 |
| 2,880,706 | Price | Apr. 7, 1959 |